United States Patent
Wall

(10) Patent No.: US 10,461,513 B2
(45) Date of Patent: Oct. 29, 2019

(54) APPARATUS FOR MOVING A LINE CART ALONG A CABLE

(71) Applicant: WALL INDUSTRIES INC., Salmon Arm (CA)

(72) Inventor: Peter Wall, Salmon Arm (CA)

(73) Assignee: WALL INDUSTRIES INC., BC (CA)

( * ) Notice: Subject to any disclaimer, the term of this patent is extended or adjusted under 35 U.S.C. 154(b) by 0 days.

(21) Appl. No.: 15/976,551

(22) Filed: May 10, 2018

(65) Prior Publication Data

US 2018/0287352 A1    Oct. 4, 2018

Related U.S. Application Data

(63) Continuation-in-part of application No. 14/576,670, filed on Dec. 19, 2014, now abandoned.

(60) Provisional application No. 61/995,718, filed on Apr. 18, 2014.

(51) Int. Cl.
| | |
|---|---|
| *H02G 1/02* | (2006.01) |
| *B61B 12/10* | (2006.01) |
| *F02B 63/02* | (2006.01) |
| *B61B 7/06* | (2006.01) |

(52) U.S. Cl.
CPC .............. *H02G 1/02* (2013.01); *B61B 12/10* (2013.01); *B61B 7/06* (2013.01); *F02B 63/02* (2013.01)

(58) Field of Classification Search
CPC ..... B60M 1/28; B25F 3/00; B25F 1/00; B25F 1/02; B60P 1/4435; B60P 1/105; A01M 31/02; B66D 3/00; B61H 9/02; B62M 6/80; B27B 11/06; B61C 13/06; B61C 17/04; H02G 1/02; H02G 1/04; B61B 7/06; B61B 12/02; B61B 12/028; B61B 12/00; B61B 12/001; F02B 63/02; B61D 15/105; B61D 15/125; B61D 15/00
USPC .................................. 182/36; 104/112–117.1
See application file for complete search history.

(56) References Cited

U.S. PATENT DOCUMENTS

| | | | | |
|---|---|---|---|---|
| 547,528 | A * | 10/1895 | Weaver et al. ........... | A63G 1/12 105/91 |
| 2,953,101 | A | 9/1960 | Sommer | |
| 3,315,615 | A * | 4/1967 | Nydegger ............... | B07C 3/082 104/177 |
| 3,336,878 | A | 8/1967 | Malakhoff | |
| 3,405,651 | A * | 10/1968 | Harmon .................... | B61B 7/06 104/173.2 |
| 3,702,124 | A * | 11/1972 | Highland .................. | B61B 7/06 104/112 |
| 3,854,407 | A * | 12/1974 | Cocroft ..................... | B61B 7/06 104/112 |

(Continued)

FOREIGN PATENT DOCUMENTS

| | | |
|---|---|---|
| DE | 371244 | 3/1923 |
| EP | 2527287 | 11/2012 |

(Continued)

*Primary Examiner* — Daniel P Cahn
(74) *Attorney, Agent, or Firm* — Field LLP

(57) ABSTRACT

A line cart puller for moving a line cart along overhead conductors and past support towers. The line cart puller has a workspace for supporting a user and/or payload therein, and has a drive wheel able to connect to and disconnect from an overhead conductor hi order to reposition the puller around and past a support tower. The puller also has a motor of a hand-operated tool able to removably connect to a transmission system for driving the drive wheel.

7 Claims, 7 Drawing Sheets

(56) References Cited

U.S. PATENT DOCUMENTS

| | | | | |
|---|---|---|---|---|
| 3,870,280 | A * | 3/1975 | Victor | H02G 7/10 254/134.3 R |
| 4,163,480 | A * | 8/1979 | Highland | H02G 1/02 104/112 |
| 4,169,522 | A * | 10/1979 | Highland | B61B 12/06 182/14 |
| 4,238,038 | A | 12/1980 | Fikse et al. | |
| 4,257,497 | A * | 3/1981 | Schroeder | B60T 1/10 188/181 R |
| 4,515,281 | A * | 5/1985 | Maki | A01G 23/003 212/122 |
| 4,754,886 | A | 7/1988 | Hirano | |
| 4,757,786 | A * | 7/1988 | Ellegard | B27B 17/10 123/198 DC |
| 4,882,998 | A * | 11/1989 | Lipp | B61C 13/06 104/112 |
| 5,009,353 | A | 4/1991 | Alquist | |
| 5,103,738 | A * | 4/1992 | Claussen | B61B 7/06 104/112 |
| 5,297,654 | A * | 3/1994 | De Forges De Parny | H02G 1/02 182/142 |
| 5,494,132 | A * | 2/1996 | Hansen | B61B 12/00 104/112 |
| 5,705,917 | A * | 1/1998 | Scott | F02B 63/04 310/156.21 |
| 6,186,275 | B1 * | 2/2001 | Charest | H02G 1/02 182/142 |
| 6,199,829 | B1 | 3/2001 | Brown et al. | |
| 6,216,649 | B1 * | 4/2001 | Laydera-Collins | F02B 33/04 123/65 A |
| 7,021,510 | B2 * | 4/2006 | Ellingson | B61B 7/06 104/178 |
| 7,624,684 | B2 | 12/2009 | Morris | |
| 7,966,941 | B1 * | 6/2011 | Brannan | A63G 21/22 104/112 |
| 8,327,770 | B2 | 12/2012 | Boren et al. | |
| 8,794,380 | B2 | 8/2014 | Glenn, Jr. et al. | |
| 10,099,902 | B1 * | 10/2018 | Dixon | B61B 3/00 |
| 2004/0050603 | A1 * | 3/2004 | Jaeger | B62K 3/002 180/181 |
| 2005/0172928 | A1 * | 8/2005 | Chittenden | A01D 42/00 123/198 R |
| 2006/0150857 | A1 * | 7/2006 | Pouliot | H02G 1/02 104/112 |
| 2007/0278349 | A1 * | 12/2007 | Bembridge | H02G 7/16 244/134 R |
| 2008/0202375 | A1 * | 8/2008 | Quattlebaum | A63G 21/22 104/112 |
| 2011/0056177 | A1 * | 3/2011 | Goto | B62M 6/55 56/14.7 |
| 2011/0083577 | A1 * | 4/2011 | Tilley | B61B 7/06 104/96 |
| 2012/0240812 | A1 * | 9/2012 | Drogo | B61B 12/028 104/112 |
| 2012/0318611 | A1 * | 12/2012 | Glenn, Jr. | H02G 1/02 182/36 |
| 2015/0303663 | A1 * | 10/2015 | Wall | H02G 1/02 182/36 |
| 2016/0376976 | A1 * | 12/2016 | McAndrew | F01P 1/06 123/41.57 |
| 2018/0287352 | A1 * | 10/2018 | Wall | H02G 1/02 |

FOREIGN PATENT DOCUMENTS

| | | |
|---|---|---|
| WO | 2004024528 | 3/2004 |
| WO | 2013148782 | 10/2013 |
| WO | 2013148788 | 10/2013 |
| WO | 2013148794 | 10/2013 |

* cited by examiner

APPARATUS FOR MOVING A LINE CART ALONG A CABLE

FIELD OF INVENTION

This disclosure generally relates to an apparatus for transporting a cart along suspended cables. In particular, this disclosure relates to an apparatus for transporting maintenance carts along overhead electric power transmission and distribution lines.

BACKGROUND

Overhead electric power transmission and distribution systems typically comprise multiple lines of conductors that are supported above the ground by support towers. Support towers can also be referred to as transmission towers, poles or pylons. The multiple lines of conductors also referred to simply as conductors, can form one or more circuits. The conductors are connected to the support towers by insulators, for example ceramic insulators.

Conductors can carry multiple hundreds of kilowatts. Overhead electric power transmission and distribution systems often utilize air as a primary conductor insulator. In other words, the conductors themselves can be highly energized but without any insulating material. The support towers are designed to avoid having the energized conductors arching, or directly contacting other structures and other conductors.

In order to conduct greater current loads, multiple conductors can be arranged in a parallel bundle. Conductors are bundled to each other by spacer dampers that are positioned along the length of the bundled conductors to ensure adequate spacing between individual conductors. Spacer dampers are also referred to as spacers. Bundled conductors are widely used because, in addition to conducting high current loads, this arrangement can provide a number of other benefits such as: improved thermal dissipation, increased ampere capacity and decreased corona loss.

Overhead electric power transmission and distribution lines can be exposed to harsh conditions, such as high winds, earthquakes, snow and ice. In light of these conditions, the support towers and the spacers must maintain sufficient clearance between the conductors, other structures and the ground. The requirement of sufficient clearance necessitates regular inspection and maintenance of support towers and the conductors by specialized workers or linemen, who ride in so-called line carts, which are carried on the conductors.

Cranes or helicopters can be used to place the line carts upon the conductors and to advance the line carts past the insulators on support towers. The line carts are also referred to as conductor carts and maintenance carts or skips. The line carts are designed to support and transport a worker, typically referred to as lineman or lineperson, along sections of the conductors. The line carts must be able to support the weight of the worker, their tools, and replacement equipment, such as replacement spacers, while moving the lineperson along the conductors.

U.S. Pat. No. 8,794,380 to Glenn, J. R. et al. (Glenn) teaches a line cart. The Glenn line cart is self-propelled and it includes a gasoline engine, a gasoline tank, a hydraulic pump, a hydraulic tank and hydraulic motors to drive rollers that contact two bundled conductors. Glenn teaches the use of positive engagement rollers that contact the opposite surface of the conductor lines to force the conductor lines against the drive rollers to improve the drive rollers traction. Glenn also teaches a non-motorized trolley that is pulled along the conductors by a winch. The trolley includes one or more mechanically actuated disc brakes. The various components of the Glenn line cart necessitate the use of a helicopter or crane truck to advance the line cart past the support insulators on support towers.

SUMMARY

A line cart puller is provided for moving a line cart along at least one overhead conductor and past at least one support tower. The line cart puller comprises a workspace defined at least by one or more sidewalls for supporting a payload therein and at least one drive wheel capable of connecting to and disconnecting from a first portion of a surface of the at least one overhead conductor. A motor of a hand-operated tool is operable to rotate at least one motor power output, wherein the motor is located entirely within the workspace, said motor comprising a throttle, a starter and a motor brake. A transmission system removably connectable to receive power from the motor via the motor power output to provide power to the at least one drive wheel for moving the line cart and the payload along the at least one overhead conductor. The motor throttle, starter and motor brake of the hand-operated tool serve as the motor, throttle, starter, and motor brake for the line cart puller and the at least one drive wheel is disconnectable from the at least one overhead conductor to accommodate movement of the line cart past the at least one support tower.

A method is provided for moving a line cart along at least one overhead conductor and past at least one support tower, the line cart including a workspace defined at least by its sidewalls for supporting a payload therein. The method involves connecting at least one drive wheel of the line cart puller to a first portion of a surface of the at least one overhead conductor; removably connecting a motor of a hand-operated tool to a transmission of the line cart puller via a motor power output, said transmission being connected to the at least one drive wheel, wherein the motor is located within the sidewalls of the workspace; providing power from the motor through the motor power output to the transmission and from the transmission to the at least one drive wheel for moving the line cart and the payload along the at least one overhead conductor; providing a motor, throttle, starter and brake for the line cart puller by a throttle, starter and motor brake of the motor; and disconnecting at least one drive wheel from the at least one overhead conductor to accommodate movement of the line cart past the at least one support tower.

BRIEF DESCRIPTION OF DRAWINGS

Various examples of the apparatus are described in further detail below with reference to the accompanying drawings. The drawings may not be to scale and some features or elements of the depicted examples may purposely be embellished for clarity. Similar reference numbers within the drawings refer to similar or identical elements. The drawings are provided only as examples and, therefore, the drawings should be considered merely as illustrative of the present invention and its various aspects, embodiments and options. The drawings should not be considered limiting or restrictive as to the scope of the invention.

DETAILED DESCRIPTION

Figure 1:
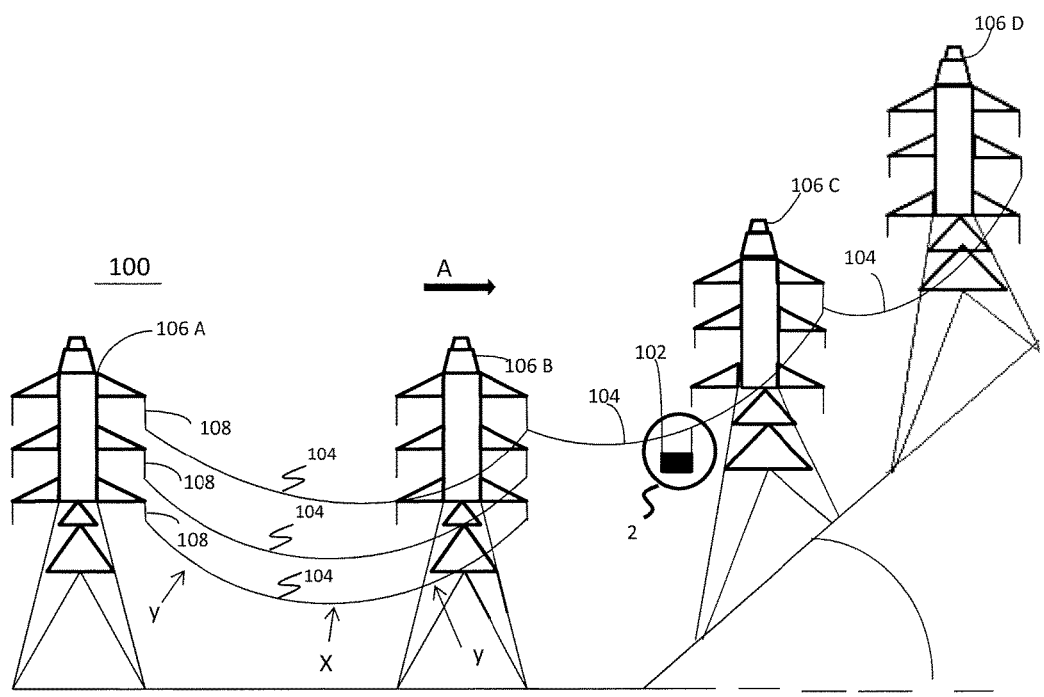
FIG. 1 is schematic representation of an example of a line cart suspended between a series of support towers.

The disclosure below uses the terms "operatively connect", "operatively connects" and "operatively connected". These terms refer to any manner of functional relationship, whether direct or not, whether permanent or not, between two or more features of the invention. A first feature is operatively connected in any way, shape or form to a second feature so that when the first feature performs an intended function, the second feature will also perform an intended function.

In another example of the invention, a line cart puller comprises a frame and a motor that is supported by the frame. The motor rotates a power output and a transmission system connects the power output to one or more drive wheels. The drive wheels cooperate with the cable to suspend the frame from the cable while the drive wheels rotate along the cable. The drive wheels comprise a compliant coating that engages the cable. The compliant coating may increase the frictional engagement of the drive wheels with the cable.

In another example of the invention, a line cart comprises sidewalls and a floor for supporting the sidewalls and a payload weight. Support arms are connected to the sidewalls, or the floor. The support members are connected between the support arms. At least one roller wheel is rotatably connected to each of the support arms and the roller wheel is cooperative with the suspended cable for supporting the line cart on the cable. The line cart further includes a line cart puller with a frame that is connectible with at least one of the sidewalls, the support arms or the cross support members. The line cart puller further comprises a motor that is supported by the frame. The motor is operable to rotate a power output. The line cart puller also includes drive wheels that are cooperative with the cable and a transmission system for operatively connecting the power output to the drive wheels. The line cart puller may also include a brake, for example that is engageable with one or more of the drive wheels. Optionally, the driver wheels of the line cart puller may include a compliant coating, either in combination with the brake or not.

Incorporating a brake that engages one or more of the drive wheels allows a lineperson to stop the line cart's movement along the conductor. Optionally, the apparatus may be used to move a line cart along a bundle of overhead conductor lines. The brake provides adequate friction so that the position of the maintenance line cart can be held against gravity. For example, the brake allows the user to stop the maintenance cart near a support tower where the slope of the conductor lines can be very steep. The brake also allows the lineperson to control descent speeds. Furthermore, the motor and transmission system provide sufficient power to allow the puller to pull the line cart and a payload weight along the suspended cable and up steep slopes, formed by the bow in the cable i.e. a catenary, such as near support towers and in mountainous areas.

Optionally, the motor can be releasably connected, or removable, from the power output, the transmission system, or both, and the motor may be releasable from the frame. With this option, a user may remove the motor to facilitate motor maintenance or replacement.

Use of the apparatus allows the weight of the line cart to remain relatively light. One possible advantage of the lightweight line cart is that an operator, acting alone, can advance the line cart past the insulators of a support tower. This avoids the necessity of having a helicopter or crane truck available for advancing the line cart past every support tower.

The apparatus can also be operatively connected to a line cart and remain within a physical footprint of the line cart. This allows the operator to approach an old spacer, position a replacement spacer at a desired location and then remove the old spacer. This is in contrast with other "winch style" line cart pullers that are positioned on one of the conductors in front of the cart. Such winches are in front of the line cart and, therefore, outside the footprint of the line cart. This positions the winch between the operator and the old spacer, which makes it inconvenient to reach around the winch to replace the old spacer.

FIG. 1 depicts a portion of an overhead electric power transmission system 100. System 100 may also represent an overhead electric power distribution system. A line cart 102 is shown suspended from a bundle of conductors 104 between a series of support towers 106A, 106B, 106C and 106D). The line cart 102 may also be referred to as a maintenance cart, a conductor cart or a skip. During maintenance operations, such as replacing spacers (not shown) within a conductor bundle 104 or otherwise, the operator 8 can move the line cart 102 along the bundle of conductors 104 in a first direction (depicted as arrow A in FIG. 1). The operator 8 may also be referred to as a lineman or lineperson. As shown in FIG. 1, the bundle of conductors 104 are fixed to the support towers by insulators 108. Between the support towers 106, the bundle of conductors 104 may bow in the shape of a catenary. Thus, the line cart 102 moves in the first direction, between for example support towers 106A and 106B, the line cart 102 will have to climb after passing the lowest-most point along the bow in the bundle of conductors (shown as position X in FIG. 1). Additionally, as the operator 8 continues in direction A, the line cart 102 will climb the steep sections between the pairs of support towers illustrated between towers 106A and 106B, between (positions Y) along the bow in the bundle of conductors 106B and 106C and between towers 106C and 106D.

Figure 2:
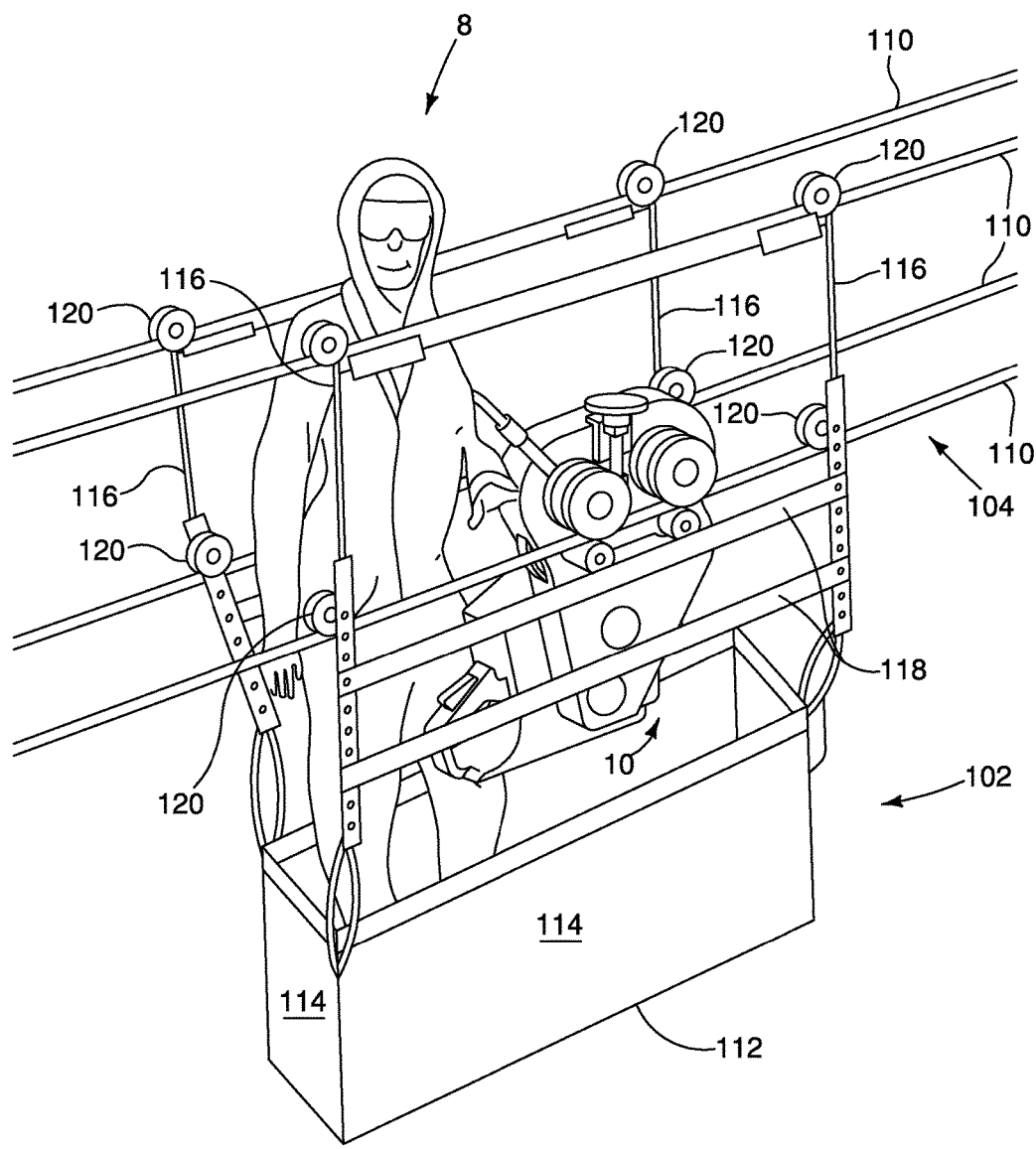
FIG. 2 is a close up view of circle 2 in FIG. 1.

FIG. 2 depicts an example of a line cart puller 10 that pulls the line cart 102 along a bundle of conductors 104. The bundle of conductors 104 is depicted as comprising four individual conductors 110; however, other numbers of individual conductors are also contemplated. The line cart 102 comprises a floor 112, sidewalls 114, support arms 116 and cross supports 118. The floor 112 and the sidewalls 114 define a workspace for supporting a payload, for example the operator 8 and any equipment or tools (not shown) that the operator 8 may require during maintenance operations. The cart line cart 102 further comprises one or more wheels 120 that are rotatably connected to the support arms 116 and/or the cross supports 118 and/or the sidewalls 114. The wheels 120 contact and roll along the individual conductors 110. The line cart 102 can be built from various rigid materials so that it can support the payload weight. For example, the line cart 102 may support payload weights in a range from, for example, about 600 lbs (approximately 272 kg) to about 750 lbs. (approximately 340 kg). In other examples, the line cart 102 may be larger with a complete payload, including two or more operators, can weigh between about 1000 (approximately 453 kg) to about 2000 lbs (approximately 907 kg). The larger and, therefore, heavier line carts 102 may be desirable for maintenance operations that require more replacement parts such as replacement spacers. Alternatively, smaller and, therefore, lighter line carts 102 may be used for maintenance operations that require fewer replacement parts.

Figure 3:
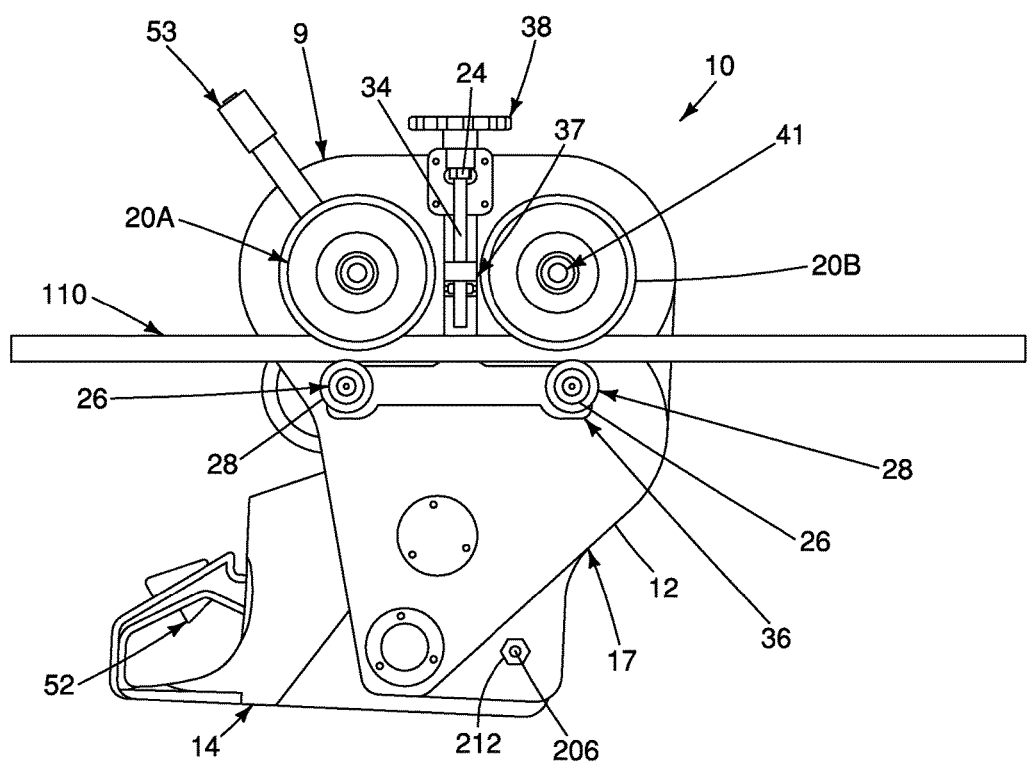
FIG. 3 is a side elevation view of an example line cart puller for use with a conductor.

FIG. 3 depicts an example of a line cart puller 10 for moving a line cart 102 along suspended cables, such as conductors 110. The line cart puller 10 comprises a puller frame 12, a motor 14, a transmission system 18 and two drive wheels 20A and 20B. While two drive wheels 20A, 20B are depicted in the various drawings, one drive wheel 20 or more than two drive wheels 20 are also contemplated.

The puller frame 12 is connected to and supports the motor 14. In one example, the puller frame 12 can be made from any durable and lightweight material, such as rolled aluminum. Puller frame 12 may also form a housing 17 for housing the transmission system 18. As depicted in the example of FIG. 3, the motor 14 may also be contained within its own housing. The housing 17 may be a box-like structure to which the motor 14 is fixed on an exterior surface and the transmission system 18, as further described below, is contained there within. The puller frame 12 is connected, releasably or permanently, to the line cart 102. For example, the puller frame 12 may be connected to the cross supports 118 of the line cart 102. However, the puller frame 12 may also be connected to one or more of the sidewalls 114, the support arms 118 and other portions of the line cart 102.

The motor 14 provides the power to drive at least one of the drive wheels 20A, 20B. As described above, advantageously the line cart 102 can support payload weights within a range of for example about 600 lbs to 750 lbs. Therefore, the motor 14 must provide the power to one or more of the drive wheels 20A, 20B that is required to move the payload weights, plus the weight of the line cart 102 and the line cart puller 10. From time to time, as described above, the cart 102 may be required to travel up steep inclines along the bowed conductors 110. Thus, motor 14 must provide sufficient power to pull a full payload weight, the line cart 102 and the line cart puller 10 up steep inclines (see angles α for example in FIG. 1 and the region adjacent position Y in FIG. 1). Preferably, the motor 14, in combination with the transmission system 18 described further below, provides the power required to climb slopes of between 10 and, advantageously approximately 40 degrees. In testing, the line cart puller 10 has pulled a line cart 102 along a conductor 110 having a steep incline of approximately 37 degrees from horizontal. In one example, the motor 14 and the transmission system 18 can generate a pound-force of between about 500 lbf (approximately 226 kgf) and about 1000 lbf (approximately 453 kgf). In another example, the motor 14 can generate about 700 lbf (approximately 317 kgf).

In one example of the line cart puller 10, not intended to be limiting, the motor 14 is a two-stroke gasoline-powered motor, with or without a centrifugal clutch. In other examples, the motor 14 may be a four-stroke gasoline powered motor, an electric motor that runs on batteries or a hydraulic motor. Other types of motors are also suitable, provided that the required power is generated and a substantial increase in weight of the line cart puller 10 is avoided. For example, the motor 14 can be selected from a group consisting of gas powered chainsaw motors, battery powered chainsaw motors, gas powered drill motors, battery powered drill motors, a gas powered string trimmer motor, and a battery powered string trimmer motor. Optionally, the motor 14 can be a chainsaw motor.

The motor 14 is operatively connected at one end to a motor power output 204. The motor output 204 may be a shaft or other elongate member with a first and second end. The first end receives a rotational force from the motor 14, which causes the motor output 204 to rotate about its longitudinal axis at various speeds and torques. The second end of the motor output 204 is operatively connected to the transmission system 18. The motor 14 includes a throttle 52 and starter 54 that is accessible by the operator 8 within the line cart 102.

The transmission system 18 operatively connects the motor 14, through the motor power output 204, to the two drive wheels 20A, 20B. In one example, the transmission system 18 comprises one or more input and step-down sprockets that are connected by drive chains. Step-down sprockets have a larger diameter than an associated input sprocket, which can increase the overall torque that is directed to the drive wheels 20A, 20B and reduces the rotational speed of the wheels.

Figure 4:
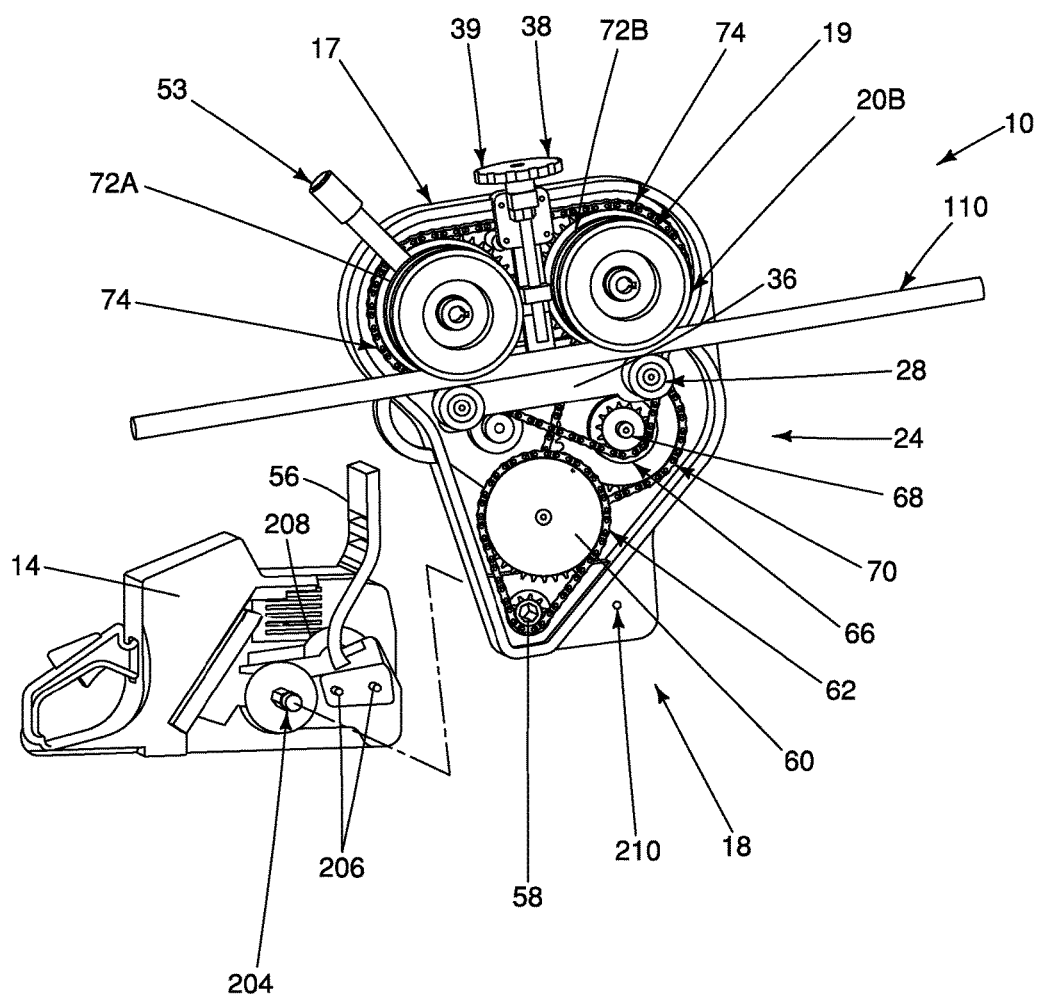
FIG. 4 is an exploded perspective view of the example line cart puller and a motor of FIG. 3 with a transmission housing cover removed.

FIG. 4 depicts one example of such a transmission system 18, with a primary input sprocket 58 that is operatively connected to the motor output 204. A primary drive chain 62 engages an outer edge of the primary input sprocket 58 and an outer edge of a primary step-down sprocket 60. The primary drive chain 62 operatively connects the primary input sprocket 58 and the primary step-down sprocket 60 such that rotation of the primary input sprocket 58 results in rotation of the primary step-down sprocket 60. A secondary input sprocket (not shown) is operatively connected to the primary step-down sprocket 60. A secondary drive chain 70 operatively connects the secondary input sprocket to a secondary step-down sprocket 66. A tertiary input sprocket 68 is operatively connected to the secondary step-down sprocket 66. A tertiary drive chain 74 operatively connects the tertiary input sprocket 68 to two tertiary step-down sprockets 72A, 72B. The tertiary step-down sprocket 72A is operatively connected to the drive wheel 20A and the tertiary step-down sprocket 72B is operatively connected to the drive wheel 20B.

Other examples of the transmission system 18 may comprise more or less input sprockets operatively connected to more or less step-down sprockets. Optionally, the drive chains may be belts, ropes or other types of connectors that operatively connect an input sprocket with a step-down sprocket. Other types of reduction gearing would also work as would be known to one skilled in the art.

Without intending to be limiting, other examples of the transmission system 18 are adaptable by changing the various input sprockets and step-down sprockets with sprockets of differing overall diameters to provide any desired input: output speed ratio. In some instances, it may be desirable to have lower input:output speed ratio to provide a puller 10 that can travel at faster speeds. Alternatively, it may be desirable to have higher input:output speed ratios to provide a puller 10 that can pull a line cart 102 up and down mountainous terrain.

In one example, the transmission system 18 provides an input:output speed ratio range of less than 10:1 to greater than 50:1. In another example, the transmission system 18 provides an input:output speed ratio range of 20:1 to 38:1. In another example, the transmission system 18 provides an input:output speed ratio of 38:1. The inventor has observed that higher input:output speed ratios may result in: higher torques being applied to the drive wheels 20A, B; a greater load capacity for a given power output of the motor 14; dynamic braking of the drive wheels 20A, 20B when the motor's 14 clutch is engaged; and, transmission drag if the drive wheels 20A, 20B are coasting (i.e. not under power from the motor 14).

The drive wheels 20A, 20B are operatively connected to the transmission system 18 with the motor 14 causing the tertiary step-down sprockets 72A, B to rotate, which in turn cause the drive wheels 20A, 20B to rotate. A drive wheel axle 41, seen in FIG. 6, connects the tertiary step-down sprockets 72A, 72B with the drive wheels 20A, 20B. Optionally, only one of the drive wheels 20A, 20B is operatively connected to the transmission system 18. In another option, there may be more than two drive wheels 20, with one or more of the drive wheels 20 operatively connected to the transmission system 18.

Figure 7:
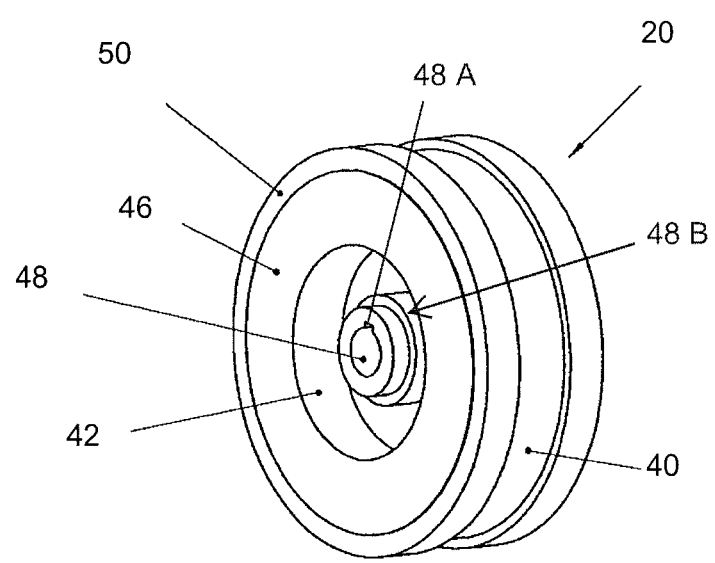
FIG. 7 is a perspective view of an example drive wheel for use with the example line cart puller of FIG. 3.

When the drive wheels 20A, 20B rotate they advance by rolling along a first portion 110A of a surface of an individual conductor 110. An example drive wheel 20 is depicted in FIG. 7, the drive wheel 20 comprises a wheel rim 46, an outer circumferential surface 50 and a splined or keyed bore 48 for receiving, in driving registry, the drive wheel axle 41 journalled in bore 48. For example, bore 48 may include keyway 48A. The drive wheel 20 may also define a slot 40 that extends along the outer surface 50. The slot 40 can receive and engage the first portion 110A of the surface of the conductor 110 for stabilizing the drive wheels 20A, 20B as they roll along the first portion 110A of the surface of the conductor 110. Optionally, the outer surface of the drive wheels 20A, 20B comprises a compliant, for example resilient, coating that increases the friction between the rotating drive wheels 20A, 20B and the first portion 110A of the surface of the conductor 110. For example, the coating may be a low, low-to-medium or medium durometer grade polyurethane. However, other suitable coatings that will increase the friction between the drive wheel 20 and the conductor 110 may be used. The drive wheel 20 may also comprise a wheel drum 42 that is positioned between the outer surface 50 and the bore 48. Bore 48 may be formed in a hub 48B mounted within drum 42.

One example of the line cart puller 10 includes a tension wheel system 24 to improve the traction of the drive wheels 20 on the conductor 110. Tension wheel system 24 comprises one or more tension wheels 28, a tension wheel shaft 34 and a tension adjustment system 38. The tension wheels 28 are appropriately dispensed relative to the drive wheels 20 so as to engage a second portion 110B of the surface of the conductor 110 that is opposite to the first portion 110A of the surface of the conductor 110 engaged by the drive wheels 20. The tension wheels 28 are rotatably connected to a tension wheel support bar 36, via tension wheel bearings 26. The tension wheel support bar 36 has an extension 36A (collectively illustrated to be an inverted T-bar) that is moveably connected to a portion of the tension adjustment system 38, for example the tension wheel shaft 34. The tension adjustment system 38 includes an adjustor 39 and a bracket 37 that fixes the tension adjustment system 38 to the puller frame 12, or the housing 17, on an opposite side of the conductor 110 relative to the tension wheel support bar 36. The adjustor 39 is adapted to move the tension wheel support bar 36 and the one or more tension wheels 28 closer to, further away from the bracket 37 and thereby closer to, or further away from the conductor 110.

The adjustor 39 can be in a threaded relationship with the extension 36A of the tension wheel support bar 36, for example, shaft 34 may be a threaded spindle engaging a corresponding threaded collar 36B mounted to extension 36A, so that rotation in direction B of the adjustor 39, illustrated to be a knob, causes the tension wheel support bar 36 to advance or retreat along the threaded connection in direction C. As support bar 36 is elevated, the upper end of extension 36A slides into a corresponding receiver in bracket 37. In other examples of the tension wheel system 24, the adjustor 39 may be in a ratcheted or lock-and-pin arrangement with the extension 36A of the tension wheel support bar 36.

Translating the one or more tension wheels 28 into closer contact with the conductor 110 increases the friction between the drive wheel 20 and the conductor 110; thereby, increasing the traction of the drive wheel 20. Moving the one or more tension wheels 28 away from the conductor 110 can provide clearance to remove or install the drive wheels 20 on and off the conductor 110.

In another example of the line cart puller 10, the motor 14 may be removably connected to one or more of the puller frame 12, the housing 17, and the transmission system 18. In this example, the motor can be adapted to include one or more releasable connectors 206 that can be used to connect the motor 14. The one or more releasable connectors 206 can be released and the motor 14 can be removed from the line cart puller 10 to facilitate maintenance, repair or replacement.

Figure 5:
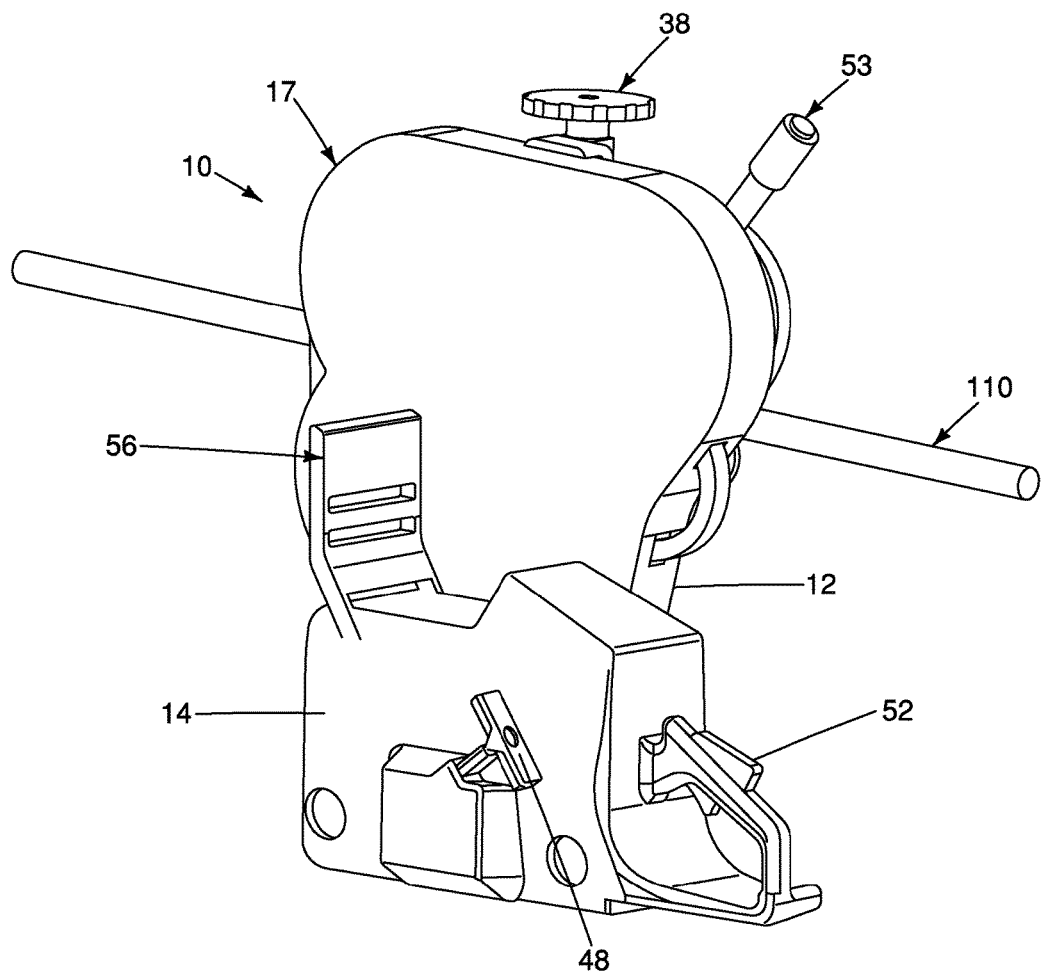
FIG. 5 is a rear perspective view of the example line cart puller of FIG. 3 depicting an example motor and an example motor brake handle.

In another example of the line cart puller 10, not intended to be limiting, the motor 14, the motor brake 208, motor housing 100, throttle 52 and starter 54 are provided by the use of a hand operated tool, for example a chainsaw. Indeed, the outline of a chainsaw is clearly seen in FIG. 5, wherein the bar and chain of the chainsaw have been removed and the chain drive of the chainsaw is instead adapted by motor output 204 to drive the primary input sprocket 58 of the lower end of the reduction gearing transmission system 18. Removing the bar and chain of the chainsaw reveals the one or more connectors 206, preferably in the form of shanks 206 that may be used to secure motor 14 to the puller 10. The one or more shanks 206 can be inserted into and extend through receiving holes 210 on the puller frame 12, or the housing 17, of the puller 10. The ends of the shank 206 may extend through the opposite side of the puller 10 than the side where the motor 14 is. The ends of the shanks 206 may each be threaded for receiving a threaded nut 212 which, when threaded on to the shanks 206, releasably connects the motor 14 to the puller frame 12 or the housing 17 or both. Thus, the chainsaw motor 14, throttle 52, starter 54, and motor brake 208 conveniently provide a motor, throttle, starter, and motor brake for the line cart puller 10 and are efficiently mounted and operatively and removably connected to the transmission system 18, which drives the drive wheels 20 *a*, 20 *b*. While a chainsaw is provided as one example, other hand operated tools such as lawn mowers, edgers, trimmers, drills or hedge trimmers, may also provide a motor that can be operatively connected to the transmission system 18.

In another example of the line cart puller 10, the housing 17 for the transmission system 18 further comprises a cover 19 that is connected to the frame and/or the housing 17 for covering an interior cavity of the housing 17. The cover 19 can be removably connected to the puller frame 12 and/or the housing 17, or not. When the cover 19 covers the interior cavity, the housing 17 can be sealed closed so that liquids, such as lubricants, may be contained within the housing 17. The housing 17 may also include one or more ports (not shown) that allow the user to introduce and remove liquids, for example lubricants, fuel, etc., into and out of the interior cavity of the housing 17 without requiring removal of the cover 19. When the cover 19 encloses the interior cavity of the housing 17, the cover 19 prevents debris from interrupting operation of the motor 14 and the transmission system 18.

The motor brake 208 can be an anti-hitch brake and can be actuated with a motor brake handle 56 (see FIG. 4). When actuated, the motor brake 208 can slow or stop one or more moving parts of the motor 14. For example, the motor brake 208 may comprise a high-tensile strength band that clamps down to generate friction on one or more moving parts of the motor 14. Actuating the motor brake handle 56 causes the motor brake 208 to slow down or stop the motor 14 and, in turn, stop the rolling of the drive wheels 20A, 20B, since the motor output 204 is connected to transmission 18 that runs the drive wheels 20A, 20B. Alternatively, other types of motor brakes 208 can be used, such as disc brakes, to slow down or stop one or more parts of the motor 14.

Figure 6:
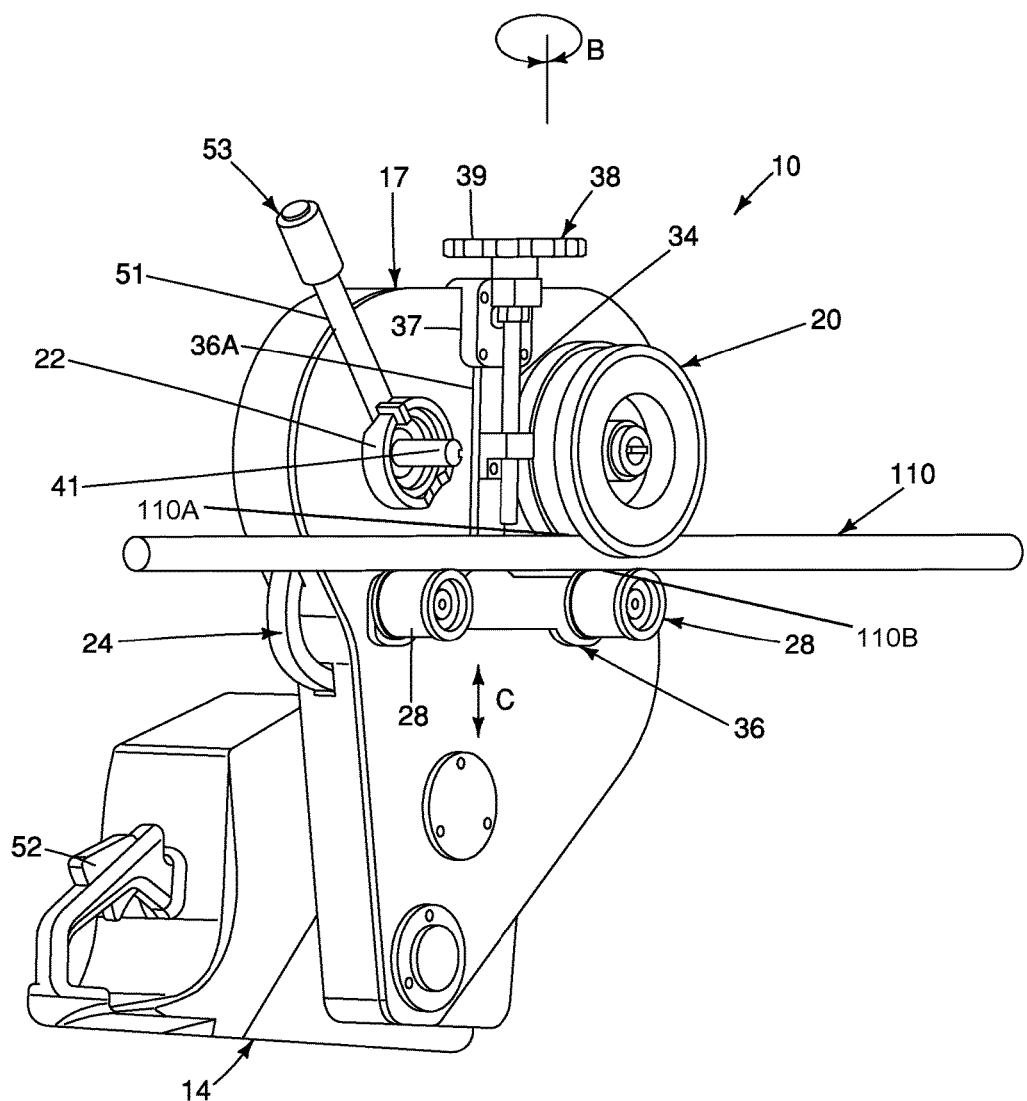
FIG. 6 is a perspective view of the example line cart puller of FIG. 3 depicted with a drive wheel removed.

Another example of the line cart puller 10 includes a second brake system 53. The second brake system 53 can engage and slow down or stop one or more of the drive wheels 20. FIG. 6 depicts one example of the second brake system 53 that comprises a brake handle 51 and a brake shoe 22. The brake handle 51 can extend away from the drive wheel 20 in any direction so that the operator 8 can grasp and actuate the brake handle 51 from most, if not all, positions within the line cart 102. The brake handle 51 is operatively connected to the brake shoe 22. The brake shoe 22 may be annular and sized to rest between hub 48B and rim 46 within the drive wheel drum 42 of the drive wheel 20. When the second brake system 53 is not actuated, the drive wheel 20 can freely rotate about the brake shoe 22. When the brake handle 51 is actuated, a cam, for example, expands the brake shoe 22 to engage, by friction, the brake shoe 22 against the inner surface of wheel drum 42 to slow or stop rotation of the drive wheel 20. The second brake system 53 allows a user to stop the line cart 102 to perform maintenance operations on a conductors 110 in positions Y, i.e., when steeply sloped. Optionally, the line cart puller 10 may include both the motor brake 208 and the second brake system 53. While an expandable brake shoe 22 that is housed within the drive wheel drum 42 of the drive wheel 20 is preferred, various other types of brakes that directly act upon the driver wheel 20 are contemplated, for example, disc brakes or other brakes as would be brown to one skilled in the art. The inventor has observed that brakes that act directly on the drive wheel 20 reduces the number of parts required for a second brake system 53, thereby reducing the weight and complexity of the second brake system 53. Reduced complexity and reduced total parts also reduces the maintenance requirements of the second brake system 53.

In another example of the line cart puller 10, the puller 10 is connected to the line cart 102 so that the puller 10 remains substantially within the physical footprint of the line cart 102. In this example, no portion of the puller 10 extends beyond the sidewalls 114 of the line cart 102. By restricting the positioning of the puller 10 to remain within the physical footprint of the puller 10 remains substantially within the workspace of the line cart 102, which means there are less structural elements that can interfere with the travel of the line cart 102 along the bundle of conductors 104 and the maintenance operations being performed thereupon. For example, the operator 8 can pull the line cart 102 into very near or direct contact with an old spacer 10 upon the bundle of conductors 104, which facilitates replacing the old spacer 10 with a new spacer 10' by the following steps: positioning the line cart 102 into very near or direct contact with an old spacer 10 that is to be replaced; installing a new spacer 10' on the bundle of conductors 104 behind the line cart 102; removing the old spacer 10 from the bundle of conductors 104; and advancing the line cart 102 along the bundle of conductors 104. Additionally, the operator 8 can advance the line cart 102 past a support tower 106. For example, without any structural elements of the line cart 102 or the puller 10 extending past the sidewalls 114, the line cart 102 can avoid catching on the support tower 106. The operator 8 can then advance the line cart 102 very close to the insulators on the support tower 106 and then disconnect the puller 10 from the bundle of conductors 104. The operator 8 can then individually disconnect the front two wheels 120 from the individual conductors 110. The operator 8 can then manually advance the line cart 102 past the insulators and reconnect the front wheels 120 to the individual conductors 110. The operator can then manually advance the line cart 102 until the rear wheels contact the insulators and the same procedure of disconnecting and reconnecting the rear wheels 10 is performed. At this point, the line cart 102 has advanced past the insulators and the puller 10 can be reconnected to the conductor 110 for advancing the line cart 102 away from the support tower under the power of the puller 10.

While the above disclosure describes certain examples and options of the present invention, various further modifications to the described examples and options will also be apparent to those skilled in the art. The scope of the claims should not be limited by the examples and options provided above; rather, the scope of the claims should be given the broadest interpretation that is consistent with the disclosure as a whole.

What is claimed is:

1. A line cart puller configured to move a line cart along at least one overhead conductor and past at least one support tower, the line cart puller comprising:
   a) a workspace defined at least by one or more sidewalls and a floor configured to support a user and a payload therein;
   b) at least one drive wheel configured to connect and disconnect from a first portion of a surface of the at least one overhead conductor;
   c) a motor of a hand-operated tool, said motor being configured to rotate at least one motor power output, wherein the motor is located entirely within the workspace, said motor comprising a throttle, a starter and a motor brake; and
   d) a transmission system configured to removably connect to the motor via the motor power output to receive power from and provide power to the at least one drive wheel for moving the line cart, the user, and the payload along the at least one overhead conductor;
   wherein each of the motor, the throttle, the starter and the motor brake of the hand-operated tool is configured to removably attach between the hand-operated tool and the transmission system, and wherein the at least one drive wheel is disconnectable from the at least one overhead conductor to accommodate movement of the line cart past the at least one support tower.

2. The line cart puller of claim 1, wherein the motor brake is actuatable by a motor brake handle to cause one or more moving parts of the motor to slow or stop, which in turn serves to slow down or stop the transmission system and in turn slows down or stops movement of the at least one drive wheel.

3. The line cart puller of claim 1, further comprising at least one tension wheel engageable with a second portion of the surface of the overhead conductor.

4. The line cart puller of claim 1, further comprising a second brake system engageable directly with the at least one drive wheel to slow down or stop the at least one drive wheel.

5. The line cart puller of claim 4, wherein the second brake system comprises a brake shoe and the at least one drive wheel further comprises a drive wheel drum, the brake shoe being engageable with the drive wheel drum.

6. The line cart puller of claim 1, wherein the motor of the hand-operated tool is selected from the group consisting of a gas powered chainsaw motor, a battery powered chainsaw motor, a gas powered drill motor, a battery powered drill motor, a gas powered string trimmer motor, a battery powered string trimmer motor, a lawn mower motor, an edger motor, and a hedge trimmer motor.

7. The line cart puller of claim 1, wherein the transmission system provides an input and output speed ratio in a range of about 10:1 to about 50:1.

\* \* \* \* \*